Nov. 21, 1967    J. H. KAYSER ETAL    3,353,663
ADHERENT FASTENERS
Filed Feb. 10, 1966
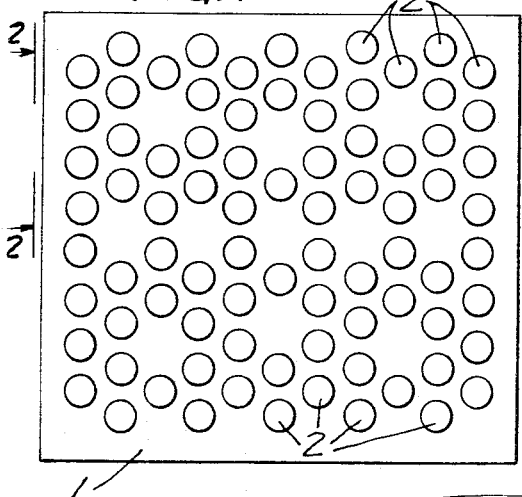
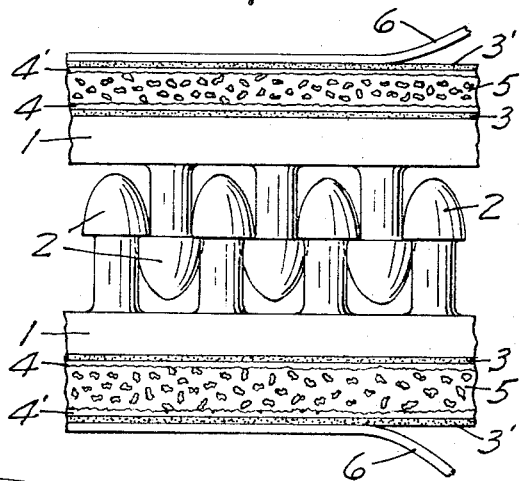
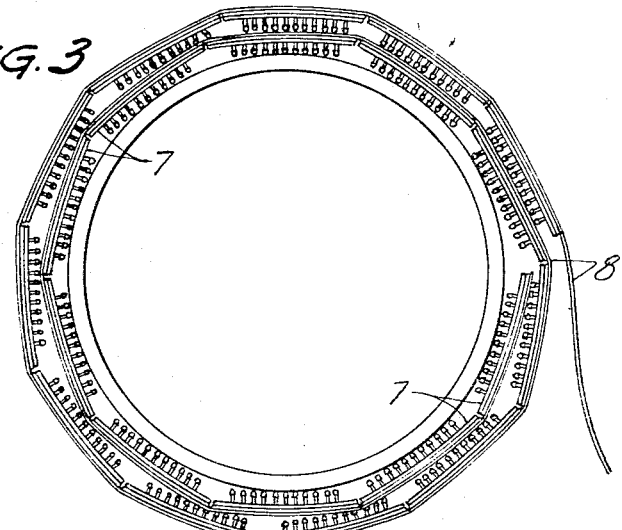
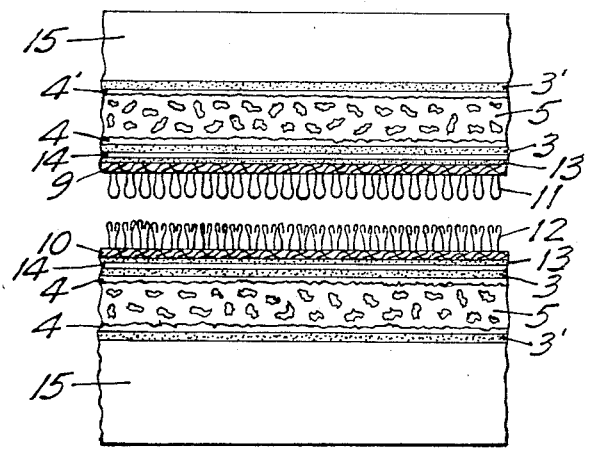
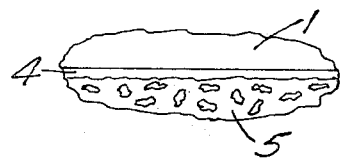
INVENTORS.
JAMES H. KAYSER
WILLIAM C. FLANAGAN, JR.
BY Carpenter, Kinney & Coulter
ATTORNEYS

United States Patent Office 3,353,663
Patented Nov. 21, 1967

3,353,663
ADHERENT FASTENERS
James H. Kayser, St. Paul, Minn., and William C. Flanagan, Jr., Hudson Township, St. Croix County, Wis., assignors to Minnesota Mining and Manufacturing Company, St. Paul, Minn., a corporation of Delaware
Filed Feb. 10, 1966, Ser. No. 526,628
10 Claims. (Cl. 206—59)

This invention relates to fasteners and more particularly to fasteners comprising two complementary articles each having a pressure-sensitive surface for adhesion to an object to be joined and a mechanical fastener surface by which it is joined to the other complementary article.

Each complementary article has (1) A relatively rigid base which remains essentially undeformed at all times during use
(2) A mechanical functional surface on one side thereof comprising a plurality of engaging elements distributed thereover, said mechanical surface being capable of mechanical interengagement and holding with and separation from the mechanical functional surface of the other article and
(3) A pressure-sensitive surface on the reverse side thereof comprising a soft viscoelastic foam layer that is up to about ¼ inch thick and is continuously covered on the side thereof facing away from the base by a thin stretchy integral flat surfaced skin to which is united a continuous, flat shiny-smooth viscoelastic aggressively-tacky pressure-sensitive adhesive coating, said pressure-sensitive surface being disposed to be pressed against and remain firmly affixed to a substrate, the combination of physical structure properties of the mechanical and pressure-sensitive surfaces being such that upon application of a separating force to substrates to which an interengaged pair of the articles are respectively affixed, separation occurs between the mechanical surfaces, the pressure-sensitive surfaces remaining firmly adhered to the substrates. Ordinarily, the pressure-sensitive surfaces of the fasteners are protected until they are adhered to objects to be joined or fastened by a removable liner having a smooth release surface. The fastener articles are normally relatively thin (from the outer side of the mechanical surface to the outer side of the pressure-sensitive surface is usually not more than about one inch and preferably not more than about ¼ inch), but can be of any desired length and width.

The fasteners of the present invention are installed by simply removing the liner covering the pressure-sensitive adhesive and pressing them firmly to a substrate. No holes, screws, bolts, etc. are needed. Furthermore, the suface to which the fastener is adhered is not defaced or marred. This is frequently important since holes might weaken the subsurface, provide locations for initiation of corrosion, destroy its liquid- or gas-tight integrity, etc. Normally, the fasteners can be later removed, if desired using a blade to cut through the foam, the residue on the substrate being removed with the aid of a solvent if this is necessary. In other cases, a blade can be used to pry the pressure-sensitive adhesive away from the substrate.

Although no particular type substrate is required, it should be ordinarily dry and clean. Relatively smooth substrates are preferred, although the pressure-sensitive surfaces of the articles of the invention do adhere remarkably to relatively rough substrates.

The invention also includes single articles of the type described (in addition to complementary pairs thereof). Such single articles can be interengaged through their mechanical surfaces with other articles having complementary surfaces which have no pressure-sensitive surfaces but which can be otherwise affixed to substrates (e.g. bolted, screwed, secured with permanently setting adhesives, molded to be unitary with the substrate, etc.).

These fasteners are normally used in applications in which convenient reclosable fasteners are needed which are not required to bear heavy dead loads over long periods of time. Although the separating forces which are referred to herein are frequently quite large, they are of relatively short duration. As used herein, separating forces are applied at separation rates in the range of about ½ inch per minute or faster.

The fasteners are useful as door latches, to hold access panels in place in appliances, machines and automobiles, to hold relatively light trim members in place, etc. There are clearly also many situations in the home in which these fasteners can be used.

The weight of heavy members held in place by the fasteners can be supported by hinges, ledges, solid bases, etc. The fasteners can, however, support somewhat lighter weights over long periods of time and even permanently. This is made possible by the particular properties of the foam pressure-sensiive adhesive portions of the fasteners which will be more fully described hereinafter. The relatively rigid backings of the fasteners act to distribute forces over the entire fastener surface. Thus, peeling of the pressure-sensitive side (e.g. starting from one corner) away from a surface to which it is adhered is avoided.

The mechanical surfaces of the fasteners are capable of engagement and disengagement with minimal flexing of their backings. When a relatively high short term stress is applied to a fastener (as when a door or panel secured by them is opened), separation occurs between the mechanical surfaces. Thus, the complementary fastener articles remain in place to secure the door or panel when it is replaced. This performance is due to the fact that the pressure-sensitive adhesive suitable for use in the fasteners can withstand high short term stresses. In order to provide the proper balance of total disengagement forces in the fasteners (e.g. to ensure that the total short time disengagement force between the mechanical surfaces is less than the adhesion of the pressure-sensitive surface to the substrate and less than the internal strength of any portion of the fastener) it is frequently necessary to design them in such a way that one type of surface has a larger total area than the other.

Among the mechanical surfaces suitable for use in the articles of the invention are those shown in U.S. Patents 2,499,898, 2,717,437 and 2,820,277. The first of these patents relates to surfaces having interlocking mechanical prongs while the others relate to surfaces wherein one surface includes a multiplicity of small outwardly projecting loops of thin filamentary material and the other surface is provided with a multiplicity of curly or krinkled filamentary members interengageable with the loops when the surfaces are juxtaposed may be utilized.

A preferred type of mechanical fastener portion of the articles of the present invention consists of a complementary pair of interengaging unitary articles each having a functional surface comprising multiple rows of flexible cam elements emanating from a relatively rigid backing member which remains essentially flat during engagement and disengagement of the articles, in which:

(1) The elements comprise stems terminating in enlarged shaped heads which bear against the element heads of the other article during engagement and disengagement, said heads being substantially non-deformable,
(2) The spaces between the heads of the individual elements of one of the pair of articles are smaller than the space occupied by the head of each element of the other article and
(3) The rows of elements have vacant element positions to provide empty spaces at intervals over said functional surfaces so as to allow deflection of the elements during engagement and disengagement.

Mechanical fasteners of this type are described in the United States patent application of William C. Flanagan, Jr. Ser. No. 423,889 filed Dec. 14, 1964, now Patent No. 3,266,113. The complementary articles often (but not always) have identical functional surface contours. Such fasteners which are of use in the present invention are capable of engagement from only one side of the functional surfaces and normally have a solid base. Usually, but not necessarily, they are capable of only a single depth of engagement. Such mechanical fasteners are exemplified in FIGS. 1 and 2 of the drawings.

Various embodiments of the invention are illustrated by the accompanying drawings wherein:

FIG. 1 is a top view of a single article of the invention viewed from the side of the mechanically interlocking surface.

FIG. 2 is a side view of an interlocking pair of such articles viewed from the direction of line 2 of FIG. 1.

FIG. 3 shows a roll comprising a low adhesion liner in strip form carrying a line of articles of the invention with the pressure-sensitive surfaces thereof adhered to the liner.

FIG. 4 is a side view of a complementary pair of somewhat different articles of the invention mounted on structural substrates. The mechanical surfaces of the articles of FIG. 4 are not interengaged.

FIG. 5 shows a fragmentary detail of a fastener shown in FIG. 2 in which a different method of manufacture was used. The articles in FIGS. 1, 2, 4 and 5 are shown somewhat larger than they are normally manufactured for purposes of clarity.

As noted previously, the articles of FIGS. 1 and 2 have mechanical fastener surfaces of a preferred type (having a relatively rigid backing member and rows of headed elements with vacant element positions at intervals). In FIGS. 1 and 2, 1 denotes the rigid backings or bases of the mechanical fastener portions of the articles and 2 denotes the headed elements. In FIG. 2 pressure-sensitive adhesive coating 3 on each article is adhered directly to the base 1 and, continuing outward, there are in order, 4 a thin skin integral with the foam layer 5, layers 4' and 3' which are respectively a skin layer integral with the foam and a pressure-sensitive adhesive coating (corresponding to layers 4 and 3) and, finally, 6 a removable liner having a smooth release surface. The heads of the elements can be round rather than bullet shaped, or they can have other configurations.

Ordinarily in articles of the invention having this particular combination of layers, i.e. with a pressure-sensitive layer intermediate the relatively rigid base and the foam layer, the base and mechanical surfaces (1 and 2) and the remainder of the articles are manufactured separately and then combined as will be more clearly shown hereinafter.

In FIG. 3 the individual single fastener articles 7 are adhered to the inner sides of the convolutions of the low adhesion liner 8 with their mechanical surfaces facing toward the center of the roll. Rolled in this way, the pressure-sensitive surfaces tend to be adhered to the liner rather than stripped from it (as they would if the mechanical surfaces faced outward). Alternatively interengaged pairs of the fastener articles (such as are shown in FIG. 2) can be arranged between the convolutions of a single strip of low adhesion liner with the two pressure-sensitive surfaces of each interengaged pair being adhered respectively to the inner and outer surfaces of the single liner strip. A third alternative is that in which interengaged pairs of the fastener articles are arranged between the convolutions of two strips of low adhesion liners with one pressure-sensitive surface of each interengaged pair being adhered to the inner surface of one liner strip and the other being adhered to the outer surface of the other liner strip. All three types of rolls provide convenient arrangements for the dispensing of the articles of the invention, for example, in manufacturing operations. Which is preferred will depend upon the particular use.

FIG. 4 illustrates articles of the invention in which the complementary mechanical surface backings 9 and 10 carry respectively a multiplicity of small outwardly projecting loops 11 and a multiplicity of curly or krinkled filamentary members 12 interengageable with the loops. The backings 9 and 10 of mechanical fasteners of this type are normally flexible and are therefore strongly adhered with a permanent, strong adhesive 13 (such as an epoxy cement, etc.) to a thin but relatively rigid base 14 (which can, for example, be of a light sheet metal). Continuing outward from 14, the various layers 3, 4, 5, 4' and 3' correspond to those shown in FIG. 2. The heavy members 15 are structural substrates to which the articles of the invention have been attached, the outer removable liners having been removed and the articles mounted in their positions of use.

FIG. 5 shows a fragmentary detail of a fastener of the type shown in FIG. 2 except that the foam has been prepared directly against the base of the mechanical portion of the fastener. Thus, the base 1 and the foam and its thin integral surface skin 4 are present but there is no pressure-sensitive layer.

The individual and combined properties of the various layers of the foam-adhesive portion of the articles of the invention (i.e. including all layers on that side of the relatively rigid base) are critical to the operation and utility of the fasteners. The utility of the fasteners depends upon a critical combination of physical structural characteristics as described herein. Thus using foams and/or pressure-sensitive adhesives other than the types described herein will result in articles which often soon fail. Such failure can occur, for example, by pulling of the pressure-sensitive adhesive away from the substrate or by splitting of the foam layer, etc. This can happen at the time of a relatively sudden stress (as when a panel or door which is held by the fastener is opened) or simply after a period of time in use without any sudden stress.

Preferably the foam-adhesive portions of the articles have a compressibility modulus of approximately 6 to 30 pounds per square inch at 20% compression; the foam has a dynamic storage shear modulus in the range of $10^6$ to $10^8$ dynes per sq. cm. and a loss tangent value in the range of 0.3 to 1.5 (both measured at 600 cycles per second); and the pressure-sensitive adhesive coating has a permanent hyper shear strength and essentially consists of a water-insoluble non-softening aggressively-tacky viscoelastic cross-linked polymer, such that it imparts to the article a bonding strength adhesion value of at least 30 hours. These will be more fully discussed hereinafter.

The foam layer is soft, "lossy," viscoelastic, of relatively high density and up to about ¼ inch thick although in a preferred embodiment it is about ⅛₂ inch thick. It is continuously covered on the side thereof facing away away from the rigid base by a thin stretchy integral flat-surfaced skin to which the pressure-sensitive adhesive is united in the final article. The foam must be strong and uniform to avoid any possibility of internal failure when subjected to a sudden stress (as when the mechanical fastener surfaces are snapped open). Ordinarily (due to the method of manufacture), the side of the foam layer which faces toward the rigid base is also continuously covered by a similar integral skin. The foam layer also has a dynamic storage shear modulus (G′) in the range of $10^6$ to $10^8$ dynes per square centimeter and a loss tangent value (beta) in the range of 0.3 to 1.5 (measured at room temperature and 600 cycles per second). The dynamic storage shear modulus and loss tangent value tests are well understood in the acoustic and vibration fields and need not be described here. The samples to be tested are sliced from the foam layer of the product.

The viscoelastic "viscous" or "lossy" characteristic of the foam layer is advantageous in developing a strong permanent bond of maximum contact area between the adhesive and a rough or irregular surface against which it is pressed. The foam layer does not have the quick snap-back characteristics possessed by highly elastic rubber foams, which would tend to pull the tacky adhesive surface away from valley points that are only lightly touched when the tape is initially pressed against the surface. At the same time the relative thinness and resiliency of the foam layer prevents appreciable sagging and also resists peeling, yet the rubbery foam layer has enough softness, resiliency and "give" to avoid undue rigidity and to take up and distribute applied stresses to provide a truly amazing holding power. The foam layer also provides electrical, thermal and vibrational insulation.

It has been found that certain viscoelastic polyurethane foam layers (the preparation of which is described in U.S. Patent No. 2,921,916) are well adapted to the present fasteners, both technically and economically. These have a bulk density in the range of 5 to 20 lbs. per cubic foot (0.08 to 0.32 gram per cc.) and in preferred products of the invention the foam density has been in the range of approximately 12 to 16 lbs. per cubic foot (0.19 to 0.26 gram per cc.). Neoprene foams, polyvinyl chloride foams and natural rubber foams are also useful. The use of equivalent foam materials having the requisite physical properties is contemplated.

The pressure-sensitive adhesive layer can be carried directly by the previously discussed integral skin layer on the foam or (as discussed hereinafter) there can be a primer between. The pressure-sensitive adhesive is present as a continuous flat shiny-smooth viscoelastic, stretchy aggressively-tacky coating. The pressure-sensitive adhesive should have a hyper shear strength of at least about 500 minutes, and preferably it should be permanent (i.e. the adhesive is long-aging and will not soften or turn pasty upon prolonged contact with surfaces and will maintain a highly cohesive and adhesive state). It is of a type which is aggressively tacky in its normal dry state. The samples of the adhesive used in running the hyper shear strength can be isolated by using a razor blade and the test is run according to the process described in S.N. 188,479 filed Apr. 18, 1962. Preferably, adhesive coatings which consist essentially of a water-insoluble non-softening aggressively-tacky viscoelastic cross-linked polymer are used, although coatings of equivalent adhesive material having the requisite properties can be used since it is the physical nature of the adhesive coating that is important in the fastener structure.

The presently preferred pressure-sensitive adhesives are viscoelastic cross-linked polyacrylates which inherently are aggressively-tacky and highly cohesive; the polyacrylate being a copolymer of an alkyl acylate having an average of 6 to 12 carbon atoms in the alkyl group and a small proportion (about 3 to 12%) of a copolymerizable monomer having a strongly polar functional group (such as acrylic acid, methacrylic acid, itaconic acid, acrylamide, methacrylamide, acrylonitrile, methacrylonitrile, or mixture thereof). A 90:10 copolymer of isooctyl acrylate and acrylic acid is exemplary. These copolymers are described in U.S. Patents Re. 24,906 and No. 3,008,-850. Internal cohesive strength and shear strength can be increased by cross-linking curing as described in U.S. Patents Nos. 2,925,174 and 2,973,286. Also useful are block copolymer adhesives of the type described in South African Patent 64/3013 (May 29, 1964).

The skin (the integral skin on the foam) and adhesive layers of the fastener structure are extremely thin and are of a viscoelastic stretchy nature so that the viscoelastic conformability and compressibility properties contributed by the foam layer, are effectively utilized. It is necessary that the foam and adhesive have an elastic compressibility modulus (measured by the method disclosed in Ser. No. 188,479 filed Apr. 18, 1962) within a certain range since otherwise it will be too soft and stretchy (and hence too weak) or will be too firm and insufficiently conformable. As previously noted, these requirements are satisfied when the foam and adhesive portion of the articles of the invention has a compressibility modulus within the range of approximately 6 to 30 pounds per square inch (0.4 to 2.1 kgs. per sq. cm.) at 20% compression.

It has also been found that the foam and adhesive layers of the fasteners should have good resistance to failure when subjected to a dead gravity load either due to inadequate shear strength of the adhesive or to peeling. This is measured by the bonding strength adhesion value test, which is also measured by a method disclosed in Ser. No. 188,479 filed Apr. 18, 1962. Experience indicates that a value of at least 30 hours in this accelerated test assures a durable mounting function under normal conditions of usage. The foam layer of the tape must have sufficient shear strength to avoid foam-layer failure during the minimum 30 hours period, and hence compliance with this test serves also as a demonstration of foam layer strength.

The foam-adhesive portions of the fasteners of the invention can be prepared separately as a double faced foam backed tape having low adhesion liners on both pressure-sensitive surfaces thereof. One low adhesion liner can then be removed therefrom and the rigid backing of the mechanical portion of the fastener adhered thereto. The preparation of double faced foam backed pressure-sensitive tapes suitable for use in this way in the fasteners of the present invention are described in the copending patent application of Engdahl and Buckholtz, United States Ser. No. 188,479 filed Apr. 18, 1962. Alternatively, the foam layer can be manufactured between one pressure-sensitive adhesive-coated liner sheet (as disclosed in the previously mentioned patent application) and the backing of the mechanical fastener itself, the latter being primed if desired to promote adhesion to the foam layer as it forms.

The fastener articles of the invention may include thin stretchy intermediate coatings located between the pressure-sensitive adhesive layers and the skin of the foam layer which firmly unite them. This intermediate coating may be included to provide a priming or barrier or other function which may be desired. It is to be considered as a sub-element of the composite flat-surfaced skin that covers and is unified with the cellular layer structure, and to which the adhesive coating is united. The intermediate coating permits of controlling the total thickness and strength of the functional skin element. This expedient is optional but it facilitates the manufacturing procedure and has other advantages, e.g. to increase adhesion, etc.

It is the combination of the foregoing factors on the foam-adhesive side of the fasteners of the invention (including all layers on that side of the rigid base) which have been found to be responsible for their excellent holding ability to a wide variety of substrates.

The low adhesion liners which protect the pressure-sensitive adhesive sides of the fasteners of the invention can be of polyethylene film, or a dense smooth paper carrying a polyethylene film or coating, may be used. Preferably the liner is a dense calendered paper treated with an anti-stick heat-cured silicone resin, which is insoluble in the volatile vehicle of the adhesive coating solution and retains its low adherency to the contacting adhesive even when subjected to heating.

The fasteners are conveniently handled and stored with the complementary mechanical surfaces interlocked and low adhesion liners in place over the adhesive sides of both. They can then be mounted in the location of their intended use by removing the low adhesion liner from one article, placing the fastener (i.e. both complementary articles) in place on one object to be joined, removing the other low adhesion liner and pressing the two objects to be joined together. Thereafter when the joined objects are pulled apart, separations occur between the mechanical surfaces. Often the location of the fasteners is critical on one of two surfaces to be joined but not on the other (e.g. where paneling is to be mounted on 2 x 4 inch studs).

In such cases it is desirable to first mount the interengaged fastener pairs on the surface on which the location is critical (e.g. the studs), then remove the remaining liner from each fastener pair and press the panel into place. In some cases jigs are advantageously used to properly locate the fasteners. One fastener article can be permanently mounted on the jig in each location where a fastener is needed. A second article can be mechanically interengaged with it, the liner removed from the second article and the jig pressed against one surface to be joined and then pulled away. Separation occurs between the mechanical surfaces leaving a single fastener article in each desired location. The complementary fastener articles can then either be applied to the other surface by the same method with another suitable jig or they can be interengaged with articles mounted on the first surface, the liners removed therefrom and the surfaces pressed together.

It is noted that the pressure-sensitive surfaces of the articles do not adhere strongly to a few surfaces which can be characterized as low adhesion surfaces. These surfaces generally show contact angles with water of more than 90 degrees. The substrate surfaces which are suitable for use with the articles of the invention (and are sometimes referred to herein as ordinary surfaces) show contact angles with water of 90 degrees or less.

*Example*

This example provides further details on the manufacture of presently preferred products.

A unitary article of a type described in U.S. S.N. 423,889 (filed Dec. 14, 1964) and shown in FIGS. 1 and 2 hereof is used to form the relatively rigid base and mechanical fastener surface. The article is composed of a copolymer of trioxane (a cyclic trimer of formaldehyde) which is available under the trade designation "Celcon" from the Celanese Corporation of America. The base is 1.15 square inches in area and the mechanical surface has 82 headed elements arranged in the pattern shown in FIG. 1 hereof. Two interengaged mechanical surfaces of this type require a short term separating force normal to the surfaces of 50 pounds or somewhat more to disengage them. The area of each mechanical surface is about 0.45 square inch. The reverse side of the base is covered in the manner shown in FIG. 2 with double coated foam backed pressure-sensitive tape which is approximately 1/32 of an inch thick and is available from Minnesota Mining and Manufacturing Company of Saint Paul, Minnesota under the trade mark "Scotch-Mount." The pressure-sensitive adhesive-foam side of this fastener, when adhered to an ordinary substrate, can withstand a short term force normal to the surface of about 100 pounds. Thus when a complementary pair of such fastener articles are located in the position of their intended use and subject to a separating force, separation occurs between the mechanical surfaces leaving the articles in proper position for re-engagement.

The size and number of fasteners needed for mounting a given article in any particular location depends upon the circumstances, but a useful general rule of thumb is to use at least about 4 square inches of pressure-sensitive adhesive area (i.e. on each complementary article) per pound of permanent load to be supported by the fastener (corresponding to 60 sq. cm. per kilogram). The resistance of the pressure-sensitive bond to rapidly applied stresses (such as are encountered when a panel or door secured by the fastener is opened) is normally at least 100 and often at least 300 or more times greater than its resistance to a permanent load. The resistance of the mechanical fastener surface to separation under high short term stresses and long term stresses can be varied widely depending upon the design of the surface and upon the material of construction used. Although some mechanical fasteners withstand higher short term than long term stresses, the ratio between them is normally much smaller than in the case of pressure-sensitive surfaces. The relative total forces required to cause separation at the mechanical and pressure-sensitive surfaces of a particular fastener can be designed by varying the relative areas of the two surfaces. A ratio of 2 to 1 (of the total force required to separate the pressure-sensitive surface compared to that required to separate the mechanical surface upon short term or rapid loading) provides a generally satisfactory safety factor.

What is claimed is:
1. A fastener comprising a complementary pair of interengaging articles each having
   (1) a relatively rigid base which remains essentially undeformed at all times during use
   (2) a mechanical functional surface on one side thereof comprising a multiplicity of engaging elements distributed thereover, said mechanical surface being capable of mechanical interengagement and holding with the separation from the mechanical functional surface of the other article and
   (3) a pressure-sensitive surface on the reverse side thereof comprising a soft viscoelastic foam layer that is up to about 1/4 inch thick and is continuously covered on the side thereof facing away from the base by a thin stretchy integral flat surfaced skin to which is united a continous, flat shiny-smooth viscoelastic aggressively-tacky pressure-sensitive adhesive coating, said pressure-sensitive surface being disposed to be pressed against and remain firmly affixed to a substrate, the combination of physical properties of the mechanical and pressure-sensitive surfaces being such that the total resistance to a separating force is substantially greater between each pressure-sensitive surface and an ordinary substrate to which it is affixed than between the mechanical surfaces when the latter are interengaged.

2. A fastener according to claim 1 wherein the mechanical surface and base portions of the articles consist of a complementary pair of interengaging unitary articles each having a functional surface comprising multiple rows of flexible cam elements emanating from a relatively rigid base member which remains essentially flat during engagement and disengagement of the articles, in which:
   (1) the elements comprise stems terminating in enlarged shaped heads which bear against the element heads of the other article during engagement and disengagement, said heads being substantially non-deformable,
   (2) the spaces between the heads of the individual elements of one of the pair of articles are smaller than the space occupied by the head of each element of the other article and
   (3) the rows of elements have vacant element positions to provide empty spaces at intervals over said functional surfaces so as to allow deflection of the elements during engagement and disengagement.

3. A fastener according to claim 2 wherein the mechanical surfaces are capable of only a single depth of interengagement and the pressure-sensitive surfaces are each approximately 1/32 in. thickness.

4. A fastener according to claim 1 wherein both mechanical surfaces have fabric materials thereon, one of which includes a multiplicity of small outwardly projecting loops of thin filamentary material and the other of which is provided with a multiplicity of curly or krinkled filamentary members interengageable with the loops when the surfaces are brought into engagement.

5. A roll comprising a continuous strip of low adhesion liner wound in convolutions and having arranged between said convolutions a multiplicity of discrete fastener articles each having
   (1) a relatively rigid base which remains essentially undeformed at all times during use
   (2) a mechanical functional surface on one side thereof comprising a multiplicity of engaging elements distributed thereover, said mechanical surface being capable of mechanical interengagement and holding with and separation from a complementary mechanical functional surface and (3) a pressure-sensitive surface on the reverse side thereof comprising a soft viscoelastic foam layer that is up to about ¼ inch thick and is continuously covered on the side thereof facing away from the base by a thin stretchy integral flat surfaced skin to which is united a continuous, flat shiny-smooth viscoelastic aggressively-tacky pressure-sensitive adhesive coating, said pressure-sensitive surface being disposed to be pressed against and remain firmly affixed to a substrate, the combination of physical properties of the mechanical and pressure-sensitive surfaces of each fastener article being such that the total resistance to a separating force is substantially greater between the pressure-sensitive surface and an ordinary substrate to which it has been firmly affixed than between the mechanical surface and a complementary mechanical surface with which it has been interengaged.

6. A roll according to claim 5 containing only a single continuous strip of low adhesion liner wherein individual single fastener articles are adhered by their pressure-sensitive surfaces to the inner sides of the convolutions of the low adhesion liner and their mechanical surfaces face inward toward the center of the roll.

7. A roll according to claim 5 containing only a single continuous strip of low adhesion liner wherein interengaged pairs of fastener articles are adhered by their two pressure-sensitive surfaces to the inner and outer surfaces of the convolutions of the low adhesion liner.

8. A roll according to claim 5 containing two continuous strips of low adhesion liner wound together in convolutions and having a multiplicity of interengaged pairs of fastener articles adhered by their two pressure-sensitive surfaces to the inner surfaces of the convolutions of one low adhesion liner strip and to the outer surfaces of the convolutions of the other low adhesion liner strip.

9. An article according to claim 5 wherein the mechanical surface and base portions of each discrete fastener article consists of a functional surface capable of interengaging with, holding and disengaging from a complementary surface and comprising multiple rows of flexible cam elements emanating from a relatively rigid backing member which remains essentially flat during engagement and disengagement of the articles, in which:

(1) the elements comprise stems terminating in enlarged shaped heads which bear against the element heads of the other article during engagement and disengagement, said heads being substantially nondeformable, (2) the spaces between the heads of the individual elements of one of the pair of articles are smaller than the space occupied by the head of each element of the other article and (3) the rows of elements have vacant element positions to provide empty spaces at intervals over said functional surfaces so as to allow deflection of the elements during engagement and disengagement.

10. A fastener article having (1) a relatively rigid base which remains essentially undeformed at all times during use (2) a mechanical functional surface on one side thereof comprising a multiplicity of engaging elements distributed thereover, said mechanical surface being capable of mechanical interengagement and holding with and separation from a complementary mechanical functional surface and (3) a pressure-sensitive surface on the reverse side thereof comprising a soft viscoelastic foam layer that is up to about ¼ inch thick and is continuously covered on the side thereof facing away from the base by a thin stretchy integral flat surfaced skin to which is united a continuous, flat shiny-smooth viscoelastic aggressively-tacky pressure-sensitive adhesive coating, said pressure-sensitive surface being disposed to be pressed against and remain firmly affixed to a substrate, the combination of physical properties of the mechanical and pressure-sensitive surfaces being such that the total resistance to a separating force is substantially greater between the pressure-sensitive surface and ordinary substrates to which it has been affixed than between the mechanical surface and a complementary mechanical surface with which it has been interengaged.

References Cited

UNITED STATES PATENTS

| | | | |
|---|---|---|---|
| 2,684,776 | 7/1954 | Rosenstein | 206—56 |
| 2,982,595 | 5/1961 | Rogers | 206—56 |

LOUIS G. MANCENE, *Primary Examiner.*